United States Patent [19]

Hausdörfer

[11] Patent Number: 4,635,104
[45] Date of Patent: Jan. 6, 1987

[54] METHOD AND SYSTEM FOR INTERFERENCE SUPPRESSION IN A COLOR TELEVISION SYSTEM

[75] Inventor: Michael Hausdörfer, Mühtal, Fed. Rep. of Germany

[73] Assignee: Robert Bosch GmbH, Stuttgart, Fed. Rep. of Germany

[21] Appl. No.: 675,194

[22] Filed: Nov. 27, 1984

[30] Foreign Application Priority Data

Nov. 30, 1983 [DE] Fed. Rep. of Germany ....... 3343262

[51] Int. Cl.⁴ .............................................. H04N 9/78
[52] U.S. Cl. ...................................... 358/31; 358/39; 358/36; 358/37
[58] Field of Search .................... 358/21 R, 31, 36, 37, 358/38, 39, 40

[56] References Cited
U.S. PATENT DOCUMENTS 3,924,266 12/1975 Harwood ............................. 358/38
4,484,216 11/1984 Rumland ............................. 358/39
4,538,178 8/1985 Bolger ................................. 358/39

Primary Examiner—Michael A. Masinick
Attorney, Agent, or Firm—Frishauf, Holtz, Goodman & Woodward

[57] ABSTRACT

To improve TV image reproduction, and to suppress interference in the luminance channel of a color TV decoder, a controlled portion of the amplitude of a part of a TV signal, which part is within the frequency range of the chroma subcarrier, is subtracted from the TV signal. The portion of the luminance signal which is within the frequency range of the chroma subcarrier is rectified to derive a control signal and the amplitude of the controlled portion which is subtracted is controlled as a function of the controlled signal. Non-linearities of reproduction by the TV tube and of human perception can be compensated within the circuit which includes, for example, a matrix, and a non-linear signal transfer channel, or derived from the TV tube itself.

10 Claims, 7 Drawing Figures

METHOD AND SYSTEM FOR INTERFERENCE SUPPRESSION IN A COLOR TELEVISION SYSTEM

Reference to related application, assigned to the assignee of the present invention: "Color Mixing or Interference Reduction Circuit in Color TV Decoding Circuits", Michael Hausdörfer, Ser. No. 675,193, filed Nov. 27, 1984, claiming priority P 33 43 261, Fed. Rep. Germany.

The present invention relates to a method and an arrangement or system to suppress interference in the luminance channels of a color television signal decoder, in which the amplitude of those portions of the luminance signal which are within the frequency range of the chroma subcarrier is reduced.

BACKGROUND

The chroma subcarrier frequency is selected in standard systems including the NTSC and PAL systems such that remanent portions of the chroma carrier within the luminance signal should cancel each other in sequence from line to line or from frame to frame, respectively. This is only effective, however, for transmission of selected scenes. Actually, remanent portions of the chroma signal may remain within the luminance signal so that decoders, particularly such as are used in color television receivers, include a chroma carrier filter or trap in order to draw off such remanent portions, decrease their amplitude, and prevent signals with chroma carrier frequency from reaching the image tube. The resolution of the reproduction is thereby impaired, with respect to the resolution which is available by the overall band widths of the video signal within the respective television system.

It has previously been proposed to separate the chromaticity signal from the luminance signal by means of comb filters. The resolution is retained, yet, other interference phenomena result.

It has also been proposed to conduct the luminance signal of the television signal to a blocking circuit which is damped in dependence on the intensity of the specific color—see, for example, U.S. Pat. No. 3,924,266, Harwood, and corresponding German patent disclosure document DE-OS 25 38 545. Such blocking circuits, however, cause phase errors within the luminance signal so that spurious oscillations may occur when substantial changes in brightness arise in the signal, for example, sudden jumps in luminous intensity.

THE INVENTION

It is an object to provide a method and a circuit arrangement or system in which interference within the luminance signal can be suppressed, but the luminance signal is influenced only if this is necessary due to its strength, or signal amplitude.

Briefly, a controlled portion of the amplitude of a part of the television signal is subtracted from the television signal; the part is that which is within the frequency range of the chroma subcarrier. The control is effected by rectifying the portion of the luminance signal which is within the frequency range of the chroma subcarrier, the rectification providing for a control signal which is used to control the amplitude of the controlled portion which is subtracted. The system can readily be carried out by apparatus which includes a band-pass filter and a control circuit, typically a controlled amplifier, which generates the subtracting signal, the control of the amplification of the amplifier being effected as a function of the output from the subtraction circuit.

The method and system have the advantage that, in the transmission of images which do not include disturbing spectral lines in the luminance signal within the range of the chroma subcarrier, the luminance signal is not influenced.

In accordance with an embodiment of the invention, compensation of shifts of luminance, which occur due to modulation, or interaction of the luminance signal with a voltage of carrier frequency, is effected. In accordance with a further embodiment of the invention, use is made of the effect that the human eye is much more sensitive to disturbances at low light level than at high light level, or intense luminance of the reproduced image.

DRAWINGS

FIG. 1b is a diagram of a portion of the decoded luminance signal in accordance with the system of FIG. 1a;

DETAILED DESCRIPTION

Figure 1A:
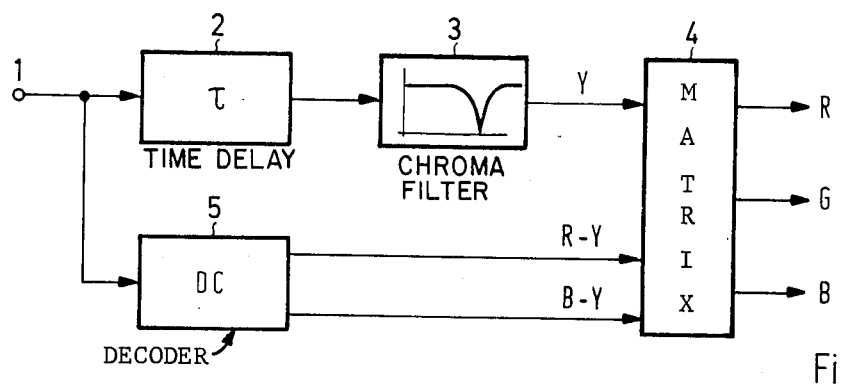
FIG. 1a shows, in highly schematic form, a block diagram of an arrangement in accordance with the prior art.
Figure 1B:
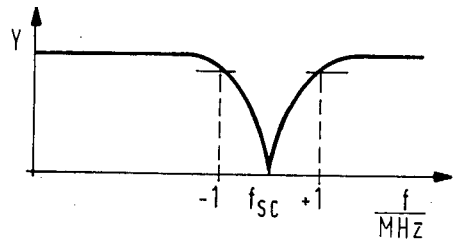

FIG. 1 collectively, illustrates the system which is known in accordance with the prior art. In FIG. 1a, a decoder is shown at 5 which is customary in color TV receivers. FIG. 1b illustrates the frequency distribution of a chroma carrier trap, or filter, which can be included within the luminance channel of the circuit of FIG. 1a.

An input terminal 1 receives the color video signal which is then conducted through a time delay line 2 to a chroma subcarrier trap or filter 3, and then applied to a matrix 4, which decodes the signals and provides the red (R), green (G), and blue (B) output signals to a color TV tube. Amplifiers, buffers and other circuits well known in the art are not necessary to an understanding of the present invention have been omitted from the diagram. The delay circuit 2 is used to match the coursing time of the luminance signal to that of the chroma signal, or, rather, to the color difference signals.

The input signal is additionally applied to a color signal decoder 5 which demodulates the color signal on its carrier and provides the two output signals R-Y and B-Y, for application to the matrix 4. The output signals from the matrix 4 are suitably amplified and then applied, for example, to the cathodes of the image reproduction tube. The filter or chroma carrier trap is, essentially, a band block filter, tuned to the chroma carrier frequency. The frequency distribution of the signal as it passes through the circuit 3 is shown in FIG. 1b.

Figure 2A:
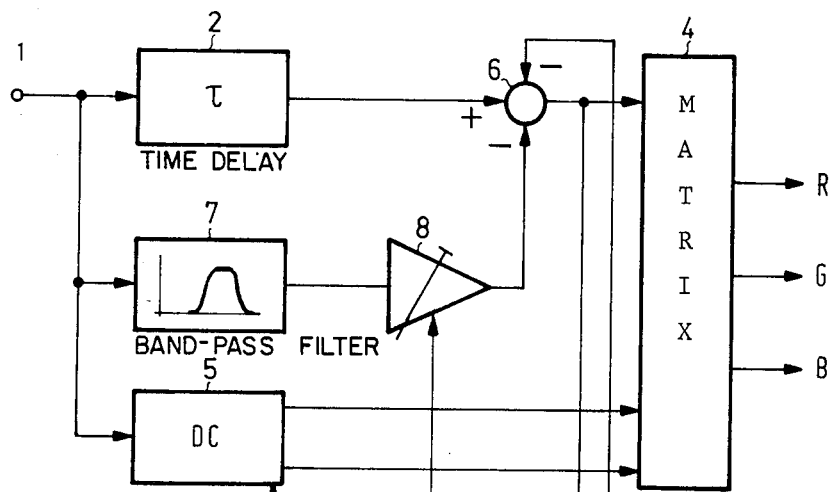
FIG. 2a is a system in accordance with the present invention.
Figure 2B:
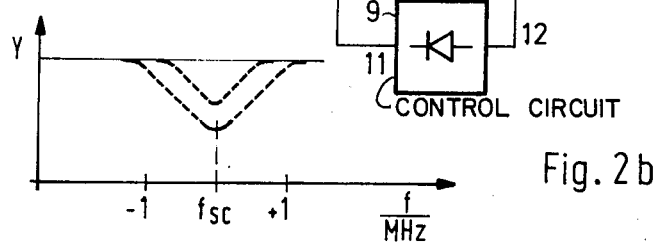
FIG. 2b is a diagram similar to FIG. 1b, but illustrating the effect in accordance with the present invention.

Components of the luminance signal which contribute to the sharpness of the received image are within the range of the chroma carrier. These components substantially increase the sharpness of the signal and, hence, by including the circuit 3 within the channel from the input terminal 1 to the matrix, the sharpness of the reproduced image is impaired. FIGS. 2a and 2b, which correspond to FIGS. 1a, 1b, illustrate the system of the present invention. Input terminal 1 again receives the TV signal, which is delayed in delay line 2, provided to match the coursing time of the signals to the remaining circuit, and having the same function as in the system of FIG. 1. Similar to the arrangement of FIG. 1, a chroma decoder 5 is provided which generates signals R-Y and B-Y for application to the matrix 4.

In accordance with the present invention, and replacing the filter 3, the arrangement of FIG. 2 includes a subtraction circuit 6 which is used in order to subtract a signal from the—delayed—input signal which is derived from the input signal through the band-pass filter 7 and the controlled circuit 8, which, in the embodiment shown, is a controlled amplifier.

The band-pass filter 7 has a band-pass curve which has a width of about 2 MHz and a center tuned frequency which is central of the entire frequency range of the chroma subcarrier frequency. The output of the subtracting circuit 6, which, of course, can be an adder with suitably polarized inputs, is connected to the input 10 of a control circuit 9. The control circuit 9 will be described in great detail with reference to FIGS. 3-5. The operation of the control circuit 9 is frequency selective and responds to signals within the range of the chroma subcarrier. It provides a control voltage at its output 11 which increases with increasing chroma subcarrier amplitude.

BASIC OPERATION

If no chroma carrier, or subcarrier is present, a control voltage is provided which controls the amplifier 8 in the direction of low amplification. The Y input of the matrix 4 will, thus, essentially receive the input signal from terminal 1, suitably time delayed by the delay circuit 2. As the chroma subcarrier increases in amplitude, or level, the control voltage likewise changes so that the amplifier 8 will provide for increased amplification, so that portions within the range of the chroma subcarrier are increasingly subtracted from the signal from input terminal 1. The signal shown in FIG. 2b, modified by the broken line curves which illustrate different intensities of chroma subcarrier portion, will be the signal being applied to the matrix 4.

In accordance with an embodiment of the invention, a further output 12 of the control circuit 9 is connected to a second subtracting input of the circuit 6, so that the circuit 6 will somewhat lower the direct portion of the luminance signal with increasing chrominance subcarrier level. The brightness impression of the reproduced image is thus compensated; this brightness impression is due to the superimposed, or modulated, rectified chroma subcarrier.

Figure 3:
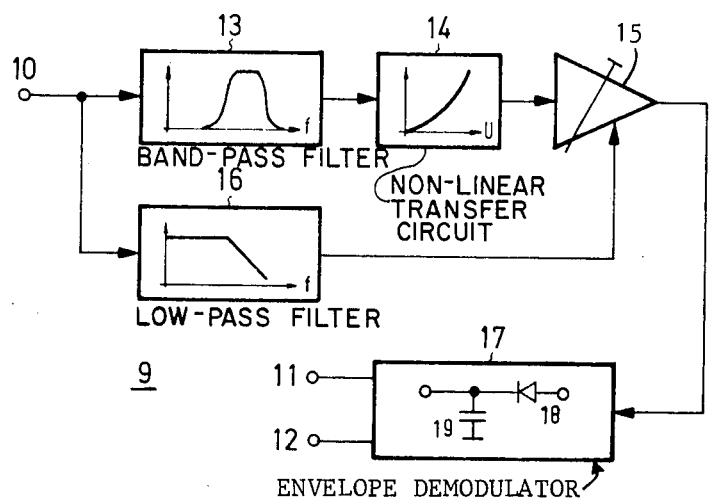
FIG. 3 is a block diagram of a further circuit suitable in the circuit of FIG. 2.

FIG. 3 is a detailed representation of the circuit 9 of FIG. 2, generating the control signal to the amplifier 8. The input 10 receives the luminance signal from the output of the subtraction circuit 6 (FIG. 2a). A band-pass 13, having a band-pass region within the frequency region of the chromaticity signal separates the chromaticity signal from the signal at input 10. The band-pass filter signal is applied to a circuit 14 which has a non-linear transfer curve and, then, to an amplifier 15 which has controlled amplification. The control input of amplifier 15 receives the luminance signal via a low-pass filter 16, which has a limit or cut-off frequency below the frequency range of the chromaticity signal. The output signal of the controlled amplifier 15 is applied to an envelope demodulator 17. Envelope demodulator 17, as shown in FIG. 3, in its most simple form, is merely a diode 18 connected to a capacitor 19, as shown in FIG. 3. More complex circuits may be used.

The output 11 of the circuit 9 is connected to the controlled input of the controllable amplifier 8 (FIG. 2a). The output is additionally connected to the subtraction circuit 6. FIGS. 2a and 3 show two separate outputs from the circuit 17, since, in dependence on the structural and circuit embodiments used, the amplifier 8 may require a voltage which differs from the voltage applied to the subtraction circuit, with respect to level, as well as polarity. Basically, however, the output signals 11 and 12 will have essentially the same wave shape and will be the outputs of the envelope demodulator. The separate outputs merely provide different signal weighting and/or polarity, which can readily be obtained by auxiliary amplifiers or other circuits, well known in this field.

Basically, the only circuit necessary for the control circuit 9 is the band-pass circuit 13 and the envelope demodulator 17. Yet, in combination with the remaining circuit components (see FIG. 2a), providing the additional elements is desirable since control of the chroma subcarrier frequency within the luminance channel is thereby ensured.

The characteristics of a TV reproduction tube is non-linear. In accordance with features of the invention, effects which are due to non-linearities of the TV image tube characteristics can be considered, e.g., the bend or non-linear characteristic of the tube. For large amplitudes of the remanence signals, a more effective or intense negative feedback is thus selected. The non-linear circuit 14, which has a characteristic matching the non-linearity of the television tube is used to this effect. The match is to compensate TV tube non-linearities.

A further effect of the bend of the characteristic of the TV reproduction tube is this: in an alternating signal, which is superimposed on a predetermined luminance signal, the positive halfwaves pass through a steeper portion of the characteristic than the negative halfwaves. Consequently, the positive halfwaves increase the luminosity of the predetermined luminance signal more than the negative halfwaves reduce the luminance signal. Due to a linear modulation of the alternating voltage of the carrier frequency remanent signal, a luminous impression is obtained which is greater than that which should occur due to the luminance signal as such. To compensate for this effect, the control voltage obtained from the envelope demodulator 17 is applied to a further subtracting input of the subtraction circuit 6.

The circuit 9 compensates for a further distortion. Measurements by Fechner have shown that the human eye is much more sensitive to changes in luminosity at low light levels than at high light levels. Thus, the luminance signal which is applied to the circuit 9 over the input 10 is utilized to control the amplification of the amplifier 15 (FIG. 3) in such a manner that amplification at low levels of luminous signal, that is, at low light level, is high, so that the output signal of the envelope detector 17 likewise is high—insofar, of course, only as high levels of chrominance signals are present. The subtraction circuit then reduces the remanent signals of chroma frequency in the luminance signal to a minimum.

EMBODIMENT OF FIGS. 4 AND 5

The characteristics of the TV tube can be used itself to obtain the effect of the non-linear transfer circuit 14 (FIG. 3).

EMBODIMENT OF FIG. 4

The elements 1–8 correspond to those described in connection with FIG. 2. Matrix 44 corresponds to matrix 4, but, additionally, includes a video amplifier, the outputs R, G, B, of which, are connected to the cathodes of the electrode beam system of the TV tube 20. All other circuit elements which are necessary to operate TV tubes have been omitted and may be in accordance with any well-known and standard television receiver system.

At least one of the anodes of the beam systems, preferably the beam system for the green signal, is used to obtain a voltage which is dropped across a dropping resistor 21 and applied to a transformer 24 via a capacitor 22. Since the remanent signals of the frequency of the chroma subcarrier are, to some extent, rectified, the anode will have a signal of double frequency thereon, for example 8.8 MHz. The secondary winding 25 of the transformer 24, together with a further capacitor 26, forms a resonant circuit which is connected to the input of the envelope detector 17. Both resonant circuits have the effect of a band filter for the signals within the range of twice the chroma subcarrier frequency. Control of damping of the portions of the chroma signal within the luminance signal is done as previously described, and the respective elements, which are identical, have been given the same reference numerals and need not be explained again.

EMBODIMENT OF FIG. 5

Figure 4:
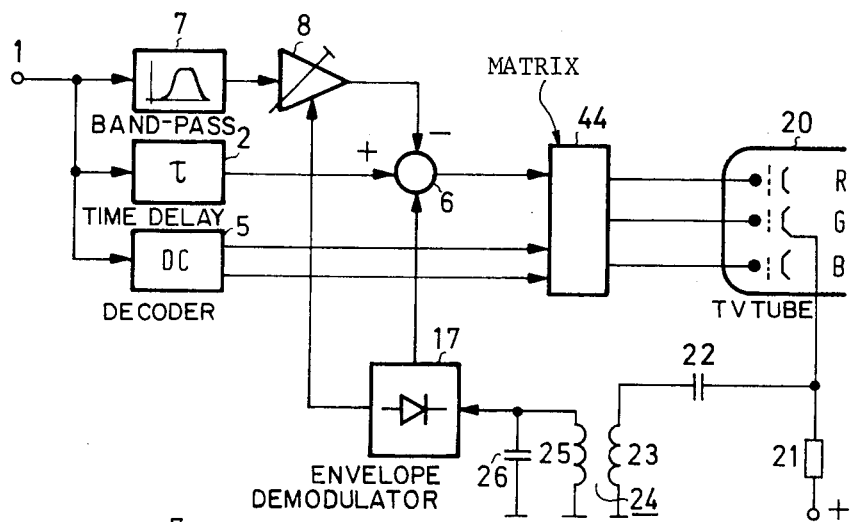
FIG. 4 is a block diagram of the system in a color television (TV) receiver.
Figure 5:
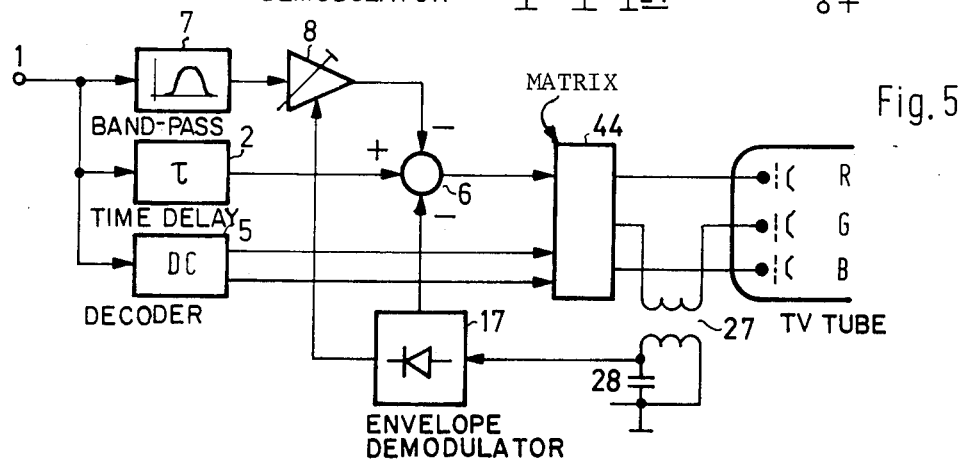
FIG. 5 is a block diagram of a further embodiment of the system applied to a color TV receiver.

The system is alternative to that of FIG. 4, and is based on the effect that application of the chroma signal to the image tube can be done through the primary winding of a transformer, the secondary winding of which, together with a capacitor 28, forms an oscillatory or tank circuit. The voltage in the tank circuit is then rectified in the envelope demodulator and used, as previously explained, to control the subtraction circuit 6 and the controlled amplifier 8.

Various changes and modifications may be made, and features described may be combined or varied within the scope of the inventive concept.

I claim:

1. Method of suppressing interference in the luminance channel of a color television decoder, including the step of lowering the amplitude of a portion of the luminance signal, which portion is within the frequency range of the chroma subcarrier,
comprising the steps of
subtracting a controlled portion of the amplitude of a part of the television (TV) signal, which part is within the frequency range of the chroma subcarrier, from the TV signal, to produce a modified TV signal;
rectifying said portion of the luminance signal, which is within the frequency range of the chroma subcarrier, to derive a control signal; and
controlling the amplitude, of said controlled portion being subtracted, by said control signal.

2. Method according to claim 1, wherein said step of subtracting from the TV signal comprises subtracting a signal corresponding to the level of the control signal from the luminance signal.

3. Method according to claim 1, further comprising the step of deriving, from said modified TV signal, said portion of the luminance signal to be rectified, by selecting a frequency sub-band out of said modified TV signal.

4. Apparatus for suppressing interference in the luminance channel of a color television decoder including a signal decoder connected to receive the television signal, demodulating said received signal and generating R-Y and B-Y signals, wherein Y represents the luminance signal and R and B, respectively, red and blue color component signals; and R-Y and B-Y represent the color difference signals;
a matrix (4,44) decoding the R-Y and B-Y signals and providing R, G, and B color signals, in which the G color signal is representative of a green color component;
a chrominance signal channel;
a luminance signal channel having two branches, each branch having the television signal to be decoded applied thereto,
a first branch of said two branches including a transfer circuit (2) passing all signals within the band width of the television signal;
a second branch including a band-pass filter (7) having a center pass frequency of about the chroma carrier frequency;
an amplitude control circuit (8) connected in said second branch;
a subtraction circuit (6) receiving the television signal through the first branch, and the amplitude controlled, band-pass signal from the second branch, and being connected to subtract the amplitude controlled signals in the second branch from the signals in the first branch;
and a control circuit (9,11) connected to receive the output signals from the subtraction circuit (6) and providing a controlled output signal to said amplitude control circuit in the second branch.

5. Apparatus according to claim 4, wherein said control circuit (9) comprises a band-pass circuit (13), a controlled amplifier (15) and an envelope detector (17).

6. Apparatus according to claim 5, wherein the control circuit comprises a band-pass (13) connected to the beam anodes of the electron beam systems of a color TV tube, and an envelope detector (17) receiving, likewise, a signal representative of the signal being applied to an anode of the electron beam systems.

7. Apparatus according to claim 6, wherein the electron beam system is the green color system.

8. Apparatus according to claim 4, wherein the control circuit includes a transformer having a primary winding connected in a chroma control signal to a color television reproducing tube, and a capacitor connected to the secondary winding of the transformer, the transformer and the capacitor forming, conjointly, a band-pass filter;
and an envelope detector (17) connected to receive the band-passed signal, the output signal of the envelope detector forming the output signal of said control circuit and being connected to said amplitude control circuit (8) in the second branch.

9. Apparatus according to claim 8, wherein the transformer is connected in the green color control circuit for the TV receiving tube.

10. Apparatus according to claim 4, wherein said amplitude control circuit comprises a controlled-amplification amplifier (8).

* * * * *